UNITED STATES PATENT OFFICE.

EMILE DE MEULEMEESTER, OF BRUSSELS, BELGIUM.

PROCESS OF MAKING YEAST EXTRACTS.

SPECIFICATION forming part of Letters Patent No. 659,214, dated October 9, 1900.

Application filed May 9, 1899. Serial No. 716,149. (No specimens.)

*To all whom it may concern:*

Be it known that I, EMILE DE MEULEMEESTER, a Belgian subject, residing at No. 54 Rue de Neufchâtel, Brussels, Belgium, have invented a new and useful Process for the Manufacture of Yeast Extracts Intended for Food, (for which I have applied for patents in Belgium, No. 138,405, dated October 15, 1898; No. 139,324, dated November 30, 1898; No. 140,386, dated January 24, 1899, dated February 22, 1899, and dated February 25, 1899; in France, dated April 6, 1899; in Germany, dated October 25, 1898, and in Great Britain, Nos. 8,780, 8,781, and 8,782, dated April 26, 1899,) of which the following is a specification.

Beer and distillery yeast contain very nutritious matters, which are embodied in their protoplasm. This protoplasm is contained in the membrane covering of the yeast. If it is desired to manufacture nutritive and assimilatable food extracts or alimentary products with this protoplasm, so as to be equal to the best extracts of meat, the yeast must be subjected to three principal and distinct operations—namely: first, the protoplasm must be extracted and dissolved; second, the matter of the protoplasm dissolved must be separated from the membrane covering of the yeast, as well as from the other residual products, and, third, the products obtained must be purified and concentrated in the form of extract.

According to my invention the extraction of the protoplasm is perfectly effected by mixing the pressed or liquid yeast with gum-arabic. In order to separate the residual product, any gelatin or albumen whatsoever may be used, which in coagulating carries along with it all the matters in suspension. Finally the purification is effected by the aid of wood-charcoal or bone-black and the concentration into extract by evaporation in the atmosphere or in a vacuum.

*Extraction of the protoplasm.*—When the pressed yeast is mixed with dry powdered gum-arabic in the proportion, for example, of one hundred grams of gum-arabic to one thousand grams of pressed yeast, after about three hours a complete liquefaction of the yeast and the gum-arabic is produced and the microscopical examination shows that the cells of the yeast have undergone a diminution of volume which is inconsiderable, but nevertheless noticeable. About four hours after the mixture has been made the whole is in fermentation. This fermentation rapidly increases and in a few hours the volume of the mass attains three to four times the original volume of the mixture. After twelve to fifteen hours the fermentation slightly diminishes in intensity and then maintains a uniform intensity for about ten hours, after which it further diminishes and ceases a few hours later. It can then be proved that the fluidity of the mass has again considerably increased. The fermentation before described is dependent on a temperature of 15° to 20° centigrade, and it is evident that the time necessary for liquefaction and for fermentation depends on the temperature of the mixture, as well as on the kind of yeast used. The high-fermentation yeast does very well at a temperature of 15° to 20° centigrade and the low-fermentation yeast at a temperature of 5° to 12° centigrade, and the time necessary for the liquefaction and the fermentation of the yeast mixed with powdered gum-arabic can vary, according to circumstances, from thirty-six to eighty hours. At the end of the process if the yeast is examined with the microscope it may be seen that the volume of the cells has diminished about two-thirds, which explains the fact before mentioned that the degree of fluidity of the mixture increases with the progress of the fermentation, because while the fermentation proceeds the protoplasm of the yeast passes osmotically from the interior of the cells into the liquefied mass. On completion of the fermentation the disintegration of the membranes of the yeast-cells is effected in order that the part of the protoplasm which the preceding process has not succeeded in extracting may become free and may be distributed in the liquefied mass. For this purpose the mixture is submitted in a heated apparatus, preferably in a water-bath, to a temperature of from 70° to 95° centigrade. The duration of this operation can vary from twelve to twenty hours, according to the temperature employed. This heating, in order to avoid evaporation, may be done in an apparatus provided with a lid or cover without pressure. The operation may be considered completed when the microscopical examination shows that all the yeast-cells are disintegrated and the protoplasm contained therein has been set free and dissolved to a large extent.

*Elimination of insoluble matters.*—The above results being obtained in order to eliminate the insoluble matters contained in the mass operated upon, the following process may be carried into effect: The mass is attenuated with two or three times its volume of water and after intimate mixture the residual products are separated from the dissolved products by one of the following modes of clarification, viz:

(A) Albumen—such as white of egg, ox's blood, or other similar matter—is dissolved in water or other liquid. The solution is then mixed with the mass of yeast extract to be clarified and the whole is heated to the degree desired in order to obtain the coagulation of the albumen. This coagulation carries with it all the residual and insoluble products of the mass and the liquid containing all the matters dissolved remains perfectly clear and brilliant. The coagulum can be separated from the clarified liquid either by decantation or by any system of filtering whatsoever.

(B) Any gelatinous substance is mixed with the yeast extract to be clarified. Such gelatinous substance may be animal or vegetable—such as Iceland moss, china-glue, or isinglass. The mixing of these materials can be done hot or cold. When the mixture is hot, the gelatinous substance dissolves, and when the liquid becomes cold again it coagulates and carries along with it the matters in suspension in the extract. When the mixture is effected cold, the gelatinous substance ought preferably to be employed in the form of jelly, which is diluted in the liquid to be clarified, and according to the density of the liquid and the composition of the matter employed the coagulum which is formed is carried to the bottom or to the surface of the receiver with the matters in suspension in the liquid.

*Purifying and concentration of the extracts.*—The purification is obtained in the following manner: Either wood-charcoal or bone-black, or these two products mixed together, may be used in charcoal filters like those employed in sugar-refineries, or, if desired, the following may be done: From two to four kilograms of bone-black or wood-charcoal in powder or a mixture of these two bodies are mixed with one hundred kilograms of protoplasm extract to be treated. This is stirred from four to six hours. Then the whole is passed through a filter or any filter-press whatsoever in order to obtain a clarified product. By this process of refining a product absolutely pure in taste and smell is obtained.

The process of refining before described can be equally applied to the raw protoplasm such as is extracted osmotically by means of gum-arabic and by the fermentation which results from it and before submitting the protoplasm to any other operation, either of solution or otherwise. Finally the concentration into extract of the purified products is obtained by their evaporation either in the open air or in a vacuum. During this evaporation the extracts can be seasoned as desired.

Having fully described my invention, what I claim, and desire to secure by Letters Patent, is—

1. In the manufacture of yeast extracts, the herein-described process of extracting and solving the protoplasm consisting in adding to pressed yeast gum-arabic substantially in the proportions specified, substantially as described.

2. The herein-described process of extracting and solving protoplasm from yeast consisting in mixing with pressed yeast gum-arabic and then heating the mixture at a temperature of 70° to 95° centigrade.

3. A process of manufacturing yeast extracts consisting in the extraction and the solution of the protoplasm by the addition of gum-arabic; the elimination of the residual and insoluble matters by the addition of a substance which will coagulate after having been mixed with it and the purification of the extracts by the addition of wood-charcoal and filtration.

In witness whereof I have hereunto set my hand in presence of two witnesses.

EMILE DE MEULEMEESTER.

Witnesses:
  A. T. E. KIRKPATRICK,
  GREGORY PHELAN.